United States Patent [19]

Menon et al.

[11] Patent Number: 5,006,234

[45] Date of Patent: Apr. 9, 1991

[54] REVERSE OSMOSIS WATER PURIFICATION SYSTEMS

[75] Inventors: Krishna S. Menon; Michael J. Witham, both of Liverpool, N.Y.

[73] Assignee: Eastman Kodak Company, Rochester, N.Y.

[21] Appl. No.: 496,570

[22] Filed: Mar. 20, 1990

[51] Int. Cl.⁵ ............................................. B01D 61/08
[52] U.S. Cl. .................................... 210/98; 210/134; 210/136; 210/257.2
[58] Field of Search ................. 210/652, 98, 134, 110, 210/259.2, 321.65, 195.2, 321.6, 321.72, 136, 137

[56] References Cited

U.S. PATENT DOCUMENTS

| | | | |
|---|---|---|---|
| 4,190,537 | 2/1980 | Tohdreau | 210/110 X |
| 4,604,194 | 8/1986 | Ehtingh | 210/137 X |
| 4,743,366 | 5/1988 | Burrows | 210/110 |
| 4,909,934 | 3/1990 | Brown et al. | 210/110 |

*Primary Examiner*—Frank Spear
*Attorney, Agent, or Firm*—Martin Lukacher; John B. Turner

[57] ABSTRACT

A reverse osmosis water purification system has a feed water line and outlets for reject and product water. Instead of wasting the reject water by allowing it to flow to a drain, the reject water is returned to the water feed line downstream of the reverse osmosis system so that is can be used for other purposes. A section of the water feed line has a flow restrictor which estabishes a dynamic pressure drop. Feed water for the reverse osmosis system is taken off the feed line upstream of the restrictor and reject water is returned downstream of the restrictor, thereby reducing the water wastage due to the reverse osmosis process.

17 Claims, 2 Drawing Sheets

REVERSE OSMOSIS WATER PURIFICATION SYSTEMS

DESCRIPTION

The present invention relates to reverse osmosis water purification systems, and particularly to reverse osmosis water purification systems which minimize the wastage of water by returning reject water which is used to provide flow across the membrane to eliminate concentration polarization at the membrane to the water feed line where it can be supplied to other utilization equipment such as faucets, toilets, washing machines, showers, etc. for useful purposes.

The invention is especially suitable for use in a reverse osmosis drinking water system which provides potable water for drinking, cooking, ice making and similar purposes in single and multi-family homes, apartments and dwellings. Aspects of the invention will also be found useful in water purification systems for commercial purposes such as in office buildings and factories.

Reverse osmosis water purification systems (sometimes referred to as filtration systems or units) utilize several times more feed water than the purified product water which they produce. The larger fraction of the total water flowing through the filter is used to create turbulent flow across the membrane which maintains the concentration polarization along the membrane to sufficiently low levels. This flow is referred to as reject or drain water, since conventionally, it is returned to the drain or sewer line. A restrictor is connected between the reject water outlet and the drain so as to minimize the reject water flow rate. The restrictor thus causes the reject water to lose its energy; the pressure of the reject water dropping to atmospheric at the downstream end of the restrictor. In some reverse osmosis systems, pumps are used to increase the feed water pressure in order to provide the necessary pressure gradient across the reverse osmosis membrane and for maintaining sufficient flow along the membrane surface.

The use of pumps does not reduce the quantity of reject water which results from the reverse osmosis process and increases the cost of the purification system.

In accordance with the present invention the reject water is not drained and wasted but is recovered for other uses. Instead of the energy of the water being wasted in an outlet restrictor, this energy is used in driving the reject or waste water to other utilization equipment such as toilets, faucets, washing machines and the like.

The invention permits the elimination of restrictors and pumps in the handling of reject water and enables most of the energy of the feed water appearing in the reject water outlet to drive the reject water through the utilization equipment. It was appreciated in accordance with the invention that the reject water in most reverse osmosis purification systems which produce product water for drinking and related purposes is still potable and certainly can be used for showering, toilet flushing, clothes washing and bathing. There is a very slight increase in the concentration of the dissolved salts in the reject water; however, this increase in concentration is hardly noticeable. The invention enables the recovery of the reject water for such purposes.

It was also appreciated in accordance with the invention that the pressure needed to drive the feed water through the reverse osmosis system was a fraction of the water supply pressure. For example, conventional domestic reverse osmosis system designed for use with domestic water supply (which provide pressures of from 50-100 PSIG) require only two to five PSI to cause product water to flow through the reverse osmosis membrane filter module or cartridge. The remaining pressure and energy is available for recovery and use in other utilization equipment in the household. It was found in accordance with the invention that there is sufficient energy (pressure) for driving the feed water through the reverse osmosis unit with a substantial amount of the energy left in the reject water to enable it to be recovered for useful purposes, such as the purposes noted above. The use of the energy in the feed water obviates the need for pumps or similar energizing devices thereby simplifying and reducing the cost of reverse osmosis water purification systems.

Accordingly it is the principal object of the present invention to provide an improved reverse osmosis water purification system wherein waste or reject water is recovered for useful purposes, for example, washing, toilet flushing and the like.

It is another object of the present invention to provide improved reverse osmosis water purification systems which are simpler and more cost effective in design than conventional systems which utilize restrictors between the reject water outlet of the system and the drain thereof and also eliminates the need for pumps.

It is a still further object of the present invention to provide improved reverse osmosis water purification systems which can operate only when water is demanded from a water supply or feed line, as when faucets, toilets and the like are used, or is operated continuously to produce product water, in both cases reject or drain water is recovered and returned to the feed line for use by the water utilization equipment (household fixtures, faucets, toilets, etc.).

It is a still further object of the invention to provide an improved reverse osmosis water purification system utilizing a bladder or squeeze water type reservoir which enables the use of the reject water in the reservoir to drive (squeeze) product water from the reservoir and also for recovering the reject water by returning it to the feed water line so that it may be used in other faucets, toilets, washing machines and the like.

Briefly described, a water purification system embodying the invention utilizes a section of a water line (a feed line) which supplies water through the section to utilization equipment such as faucets, toilets, washing machines and the like. The purification system includes a reverse osmosis system, which is referred to hereinafter as a filtration unit or R.O. unit. The reverse osmosis system has a feed water inlet, a reject water outlet and a product water outlet. Means are provided in the line section for establishing differential pressure thereacross when water flows through the line, when demanded by the utilization equipment. Means are also provided for connecting the reverse osmosis system to the line so that water supplied by the line flows from the feed water inlet to the reject water outlet thereof in response to the differential pressure across the line section. Product water is also then produced at the product water outlet. The reject water is recovered by returning it to the feed line downstream of the section. In other words the reverse osmosis system between its feed water inlet and reject water outlet is connected in parallel with the line section wherein the differential pressure is developed.

In one embodiment, a control valve is connected between the feed water inlet and the water supply at the upstream end of the section. This control valve is responsive to the dynamic differential pressure across the section which occurs when water is demanded by the utilization equipment. The valve is normally closed and the R.O. system does not receive feed water or produce product water unless water flows along the feed line. In another embodiment, the reject water outlet is connected through a normally open valve and a restrictor to drain. The control valve is responsive to the differential pressure across the section and closes when flow is demanded by the utilization equipment. There is flow continuously through the reverse osmosis system in the second embodiment. In a third embodiment a bladder or squeeze type reservoir unit is used and flow is permitted through the reverse osmosis system when needed to supply reject water for pressurizing the reservoir.

The foregoing and other objects, features and advantages of the invention as well as presently preferred embodiments thereof will become more apparent from a reading of the following description in connection with the accompanying drawings in which.

Figure 1:
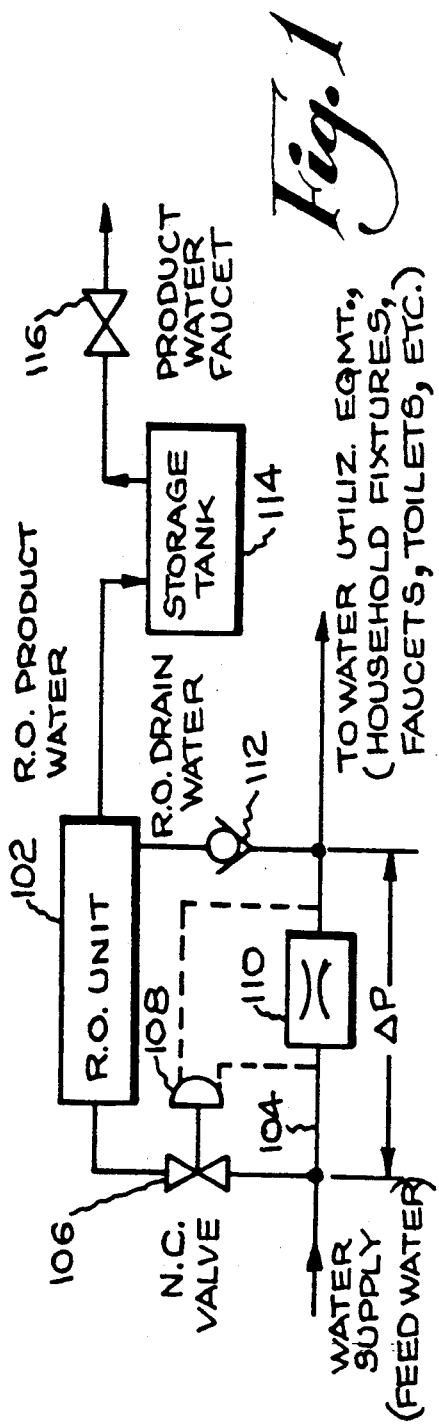
FIG. 1 is a schematic diagram of a reverse osmosis water purification system in accordance with a first embodiment of the invention.

Referring first to FIG. 1 there is shown a reverse osmosis filtration system referred to as an R.O. unit 102. This unit may be a so-called TRIPAK. TRIPAK is a trademark of Fastek, 7120 Henry Clay Boulevard, Liverpool, N.Y. 13088, which supplies TRIPAK R.O. filter units. Such units are also the subject matter of U.S. patent application Ser. No. 208,817, filed Jun. 16, 1988 in the name of B. M. Brown et al and assigned to the same assignee as the present application. The unit 102 (which, of course, can be any standard R. O. filter in a suitable housing) has a water feed inlet at the left end thereof, a reject water outlet which supplies what has heretofore been known as R.O. drain water and a product water or R.O. product water outlet. The unit 102 is supplied with feed water from a water supply or feed water line having a line section 104. The section 104 is connected via the feed water line to the water supply at its upstream end. The water supply may be the conventional domestic supply, for example at a pressure of 60 PSIG. The downstream end of the section 104 is connected to the water utilization equipment of the facility (viz. the household fixtures, faucets, toilets, etc.). A differential pressure (delta P) is established across the section 104 by means of a restrictor 110 which is illustrated as an orifice. This restrictor is selected to provide a pressure drop equal or slightly more than the drop across the R.O. unit 102 between its feed water inlet and reject water outlet. Delta P. is preferably approximately 5 PSIG. It should be sufficient to cause flow through the R.O. membrane of the unit 102 sufficient to produce product water. A differential pressure or pressure drop, delta P, of 2-5 PSIG may be suitable.

The R.O. unit 102 is effectively connected and parallel with the section 104. The feed water inlet is connected to the upstream end of the section 104 through a normally closed control valve 106 having a pressure responsive controller 108. The controller is connected across the orifice 110. Accordingly, when water is demanded by the utilization equipment and a sufficient dynamic pressure drop (2-5 PSIG, for example) is established, the valve 106 opens. Otherwise, no feed water flows through the R.O. unit 102 and no product water is produced.

The reject water outlet is connected through a check valve 112 to the downstream end of the section 104. The check valve permits flow in one direction only from the reject outlet to the downstream end of the section 104. Back flow from the water utilization equipment to the R.O. unit 102 is not permitted by the check valve 112. Accordingly, when there is sufficient dynamic pressure across the section 104, the valve 106 opens. The R.O. unit 102 produces product water which is supplied to a storage tank 114 and may be withdrawn (by gravity feed, for example) by a product water faucet 116. The reject water is recovered and returns to the feed water line. There is no restrictor so that the energy of the reject water (its pressure) is close to the water supply pressure and drives the utilization equipment. A shut off valve (not shown), which is responsive to the pressure in the tank 114 and shuts off the water supply when the tank 114 is full, may be used.

While the use of the valve 106 is preferable and it is desirable to sense flow through the line and allow the R.O. unit to produce product water only when flow occurs, the valve 106 may be eliminated in some applications. For example, when the water purification system is used in a large office building or other facility where water is continuously demanded by utilization equipment and it is desirable to collect product water continuously.

Figure 2:
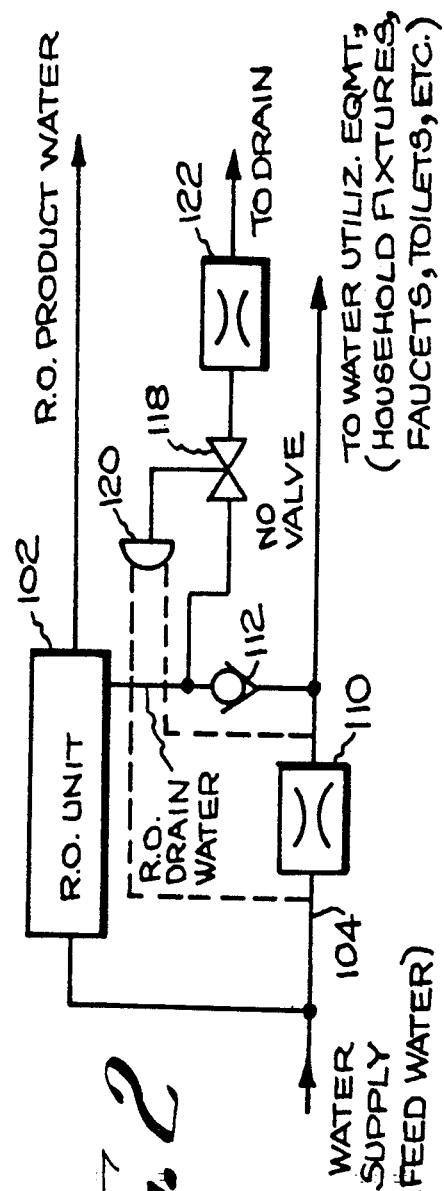
FIG. 2 is a schematic diagram of a reverse osmosis water purification system in accordance with a second embodiment of the invention.

Referring to FIG. 2 there is shown a system similar to that shown in FIG. 1 and like parts are identified by like reference numerals. In the environment of FIG. 2, R.O. unit 102 operates continuously. In the event that the water utilization equipment does not demand flow from the water supply, flow occurs through a normally open control valve 118 having a regulator 120 which senses the dynamic pressure across the orifice 110. Then a restrictor 122 comes into play, which reduces the pressure to atmospheric so that the reject water can be drained into a drain. When flow is demanded, the R.O. unit operates in response to the dynamic pressure differential across the section 104 as was the case in the embodiment in FIG. 1. The controller 120 closes the normally open valve 118 and the reject water is returned to the feed line where it supplies the water utilization equipment.

Figure 3:
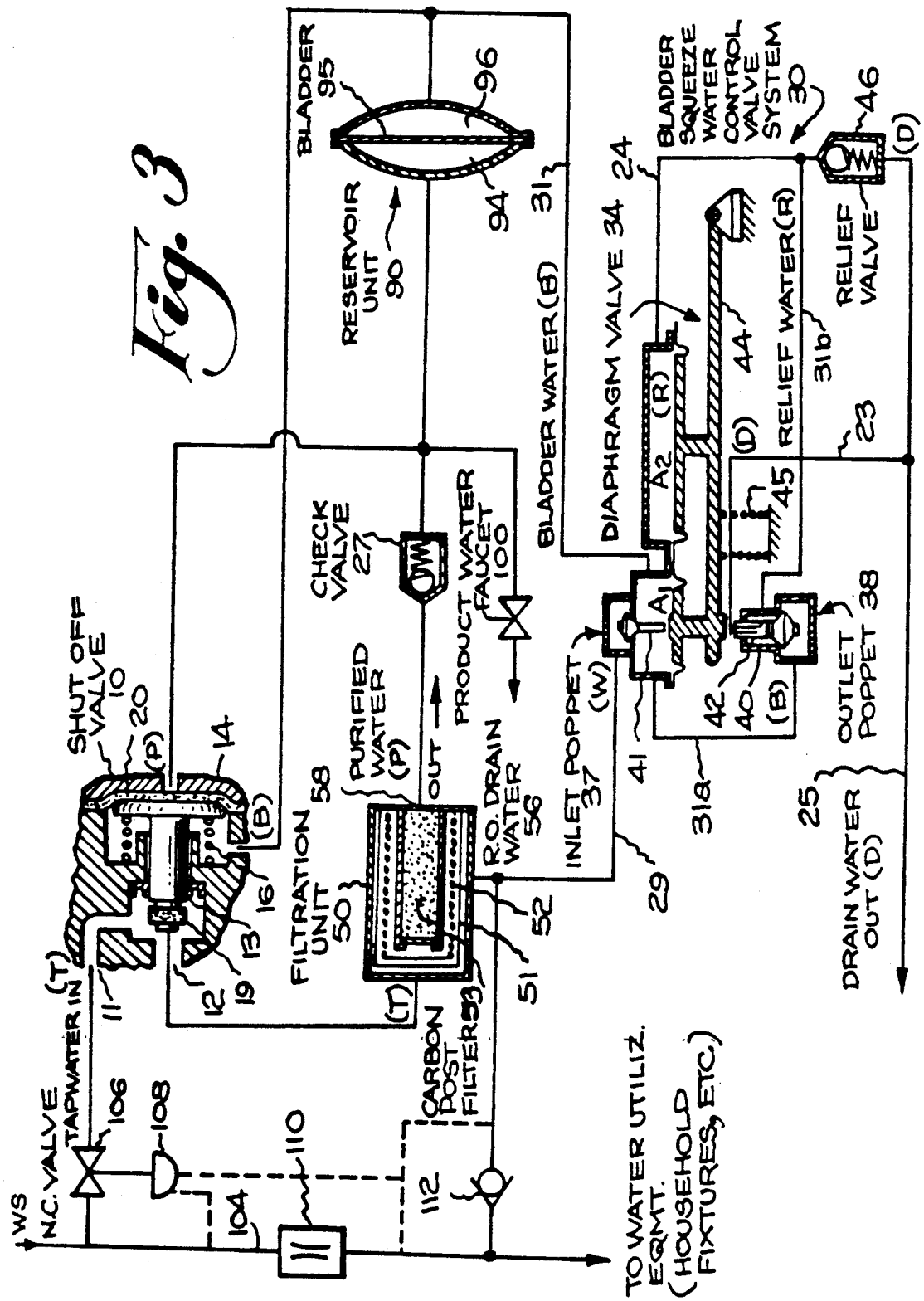
FIG. 3 is a schematic diagram of a reverse osmosis water purification system in accordance with a third embodiment of the invention.

Referring to FIG. 3 there is shown a system having a R.O. filtration unit 50 of the TRIPAK type. In FIG. 3 the TRIPAK is shown in somewhat greater detail. It has a pre-filter 51 a R.O. membrane filter 52 and a carbon particle post-filter 53. The filtration unit 50 is connected in series with a shut-off valve 10 through a normally closed control valve 106 to the upstream or water supply side of the water feed line which goes to the water utilization equipment. The system has an orifice 110 for creating a dynamic pressure differential, delta P, in response to water flow through the line, and a controller 108 responsive to the differential pressure across the orifice 110 for opening the valve 106 in response to sufficient flow through the line and a check valve 112, as described in connection with FIG. 1.

In the system shown in FIG. 3, the filtration unit 50 receives the feed water through the feed water shut-off valve 10 and separates it into product water and waste water at its purified water or product water output and at its reject water or R.O. drain water outlet, respectively. A reservoir 90 has a movable separator or bladder 95 which divides it into a product water chamber 94 for receiving the product water from the product water outlet of the unit 50 and a control or squeeze water chamber 96. The product water is delivered to an outlet connection (faucet 100) from the product water chamber 94 or directly from the filtration unit 50. A valve system 30 provides a bladder/squeeze water control valve having a diaphragm 34 with a piston 44. The valve is connected to the reject water outlet port 56 of the filtration unit 50, the squeeze water chamber 96 of the reservoir and to a drain line 25. The diaphragm valve has an inlet poppet valve 37 for providing waste water from the filtration unit 50 to the squeeze water chamber 96 of the reservoir 90 for urging the bladder 95 towards the product water chamber 94. The diaphragm valve 34 has an outlet poppet valve 38 that can drain water from the squeeze water chamber 96 of the reservoir 90 and reduce pressure in that chamber 96; thus facilitating the refilling of the product water chamber 94. A relief valve 46 downstream of the outlet poppet 38 maintains a low pressure in the system to provide a small pressure as a control signal pressure for operation of the valve 30 and avoid undesirable cycling of the valve 30 between high pressure and low pressure. The bladder or squeeze water system consisting of the shut-off valve 10, the filtration unit 50, the valve system 30 and the bladder and its interconnected plumbing and valving is similar to the squeeze water reservoir system which is available from Fastek. This squeeze water reservoir system is also the subject of U.S. patent application Ser. No. 195,560 filed May 18, 1988 in the name of Brown et al and assigned to the same assignee as the present application. U.S. Pat. No. 4,909,934 issued March 20, 1990 upon this application.

The control valve 106 controller 108 is connected to the reject water outlet 56 as well as across the orifice 110. The control valve thus is able to sense the pressure in the control or squeeze water chamber 96 of the reservoir unit 90. Accordingly, when the chamber 96 requires reject water (also known as squeeze water) the valve 106 opens even if water is not demanded by the water utilization equipment.

The structure and operation of the shut-off valve 10, the reservoir unit 90, the valve system 30 and the filtration unit 50 will be more apparent from the following description. Additional information may be obtained by referring to the above-identified U.S. patent application.

Shut-off valve 10 includes an inlet port 11 for connection to the water supply (WS). The valve 10 also has an outlet port 12 leading to the filtration unit 50 and a valve stem 13 connected to a diaphragm 14 and axially movable in its valve body for opening and closing the shut-off valve in response to product water pressure in a control chamber 20 adjacent to the diaphragm 14. Feed water inflow to port 11 is around the periphery of the valve and outflow is through the axial outlet port 12 which is closed by the valve 19 when it moves downwardly to the outlet, which acts as the seat of the valve 10.

As product water pressure in the valve control chamber 20 increases (once the reservoir unit 90 is filled), the spring force holding the valve 19 open is gradually overcome by the product water pressure in the chamber 20. The valve stem 13 moves in the closing direction until the valve 19 seats at the valve outlet port 12. When this happens the outlet pressure is further reduced because of drainage and the valve 19 is thus more firmly Pressed against its seat to effect an immediate and complete shut-off. In this condition, even if the product water pressure slowly falls off because of leakage in the faucet 100, no shut-off valve leakage occurs until the shut-off valve stem pulls the valve 19 away from its seat.

The valve system 30 is represented by a functional schematic diagram in FIG. 3 from which its construction and operation will be apparent. Of course reference may be had to the above-identified U.S. patent application for further information respecting the construction of the valve system 30. The system is connected via the line 29 to the reject water outlet port 56 of the filtration unit 50. A control (squeeze) water line 31 leads to the squeeze water chamber 96 in the reservoir 90 and to lines 23 and 24 leading to a drain 25. The line 24 leads also to a relief valve 46 and then to the drain. Line 23 leads directly to the drain from a chamber in which the operating parts of the valve (the diaphragm valve 34) are located. The system 30 senses the direction of flow of the pressurizing control (squeeze) water into and out of the squeeze water chamber 96 and automatically adjusts the squeeze water to a higher system pressure for product water delivery at a faucet 100 or a to a lower system back pressure during production of product water and reservoir filling, thereby increasing the rate of product water production and filling. The diaphragm valve 34 has an interior valve cavity beneath the valve diaphragm 44 which is open to drain 25 through the drain line 23 and is therefore always at atmospheric pressure. Inlet line 29 communicates with a diaphragm area A1 through the inlet poppet valve 37. The squeeze or bladder water outlet line 31 communicates directly with the area A1 of the diaphragm valve 34. Line 31 also communicates with another area A2 of the diaphragm valve 34 via line 31a, the outlet poppet valve 38, line 31b and line 24. The cavity facing area A2 above the diaphragm valve 34 communicates with the drain 25 to a spring loaded relief valve 46 in the drain line 24.

Poppet valve 37 includes a valve stem 41 directed towards the top of the piston 44 of the diaphragm valve 34. The outlet poppet valve 38 includes a valve stem 42 directed towards the bottom of the piston 44. Poppet valves 37 and 38 are shown at their normal at rest positions in FIG. 3 in which the inlet poppet valve 37 is held open by a spring 45 and the piston 44 pushing on the stem 41. The outlet poppet valve 38 is held closed by its own spring (not shown).

The principal flow paths of water through this system are as follows: Feed water enters the system through shut-off valve 10 and flows into the filtration unit 50 which separates the feed water as product water and waste water. Product water flows from product water port 58 of the filtration unit, through check valve 27, to control chamber 20 of the shut-off valve, to product water chamber 94 of reservoir 90, and to outlet connection 100. Waste water flows from waste water port 56 of the filtration unit (a) through the check valve 112 to section 104 downstream of restriction 110 and (b) to the regulating valve 30 through line 29.

When drawing off product water from the faucet 100, control (squeeze) water is supplied through inlet valve 37 by virtue of the diaphragm area A1 sensing the pressure in line 31. This pressure feeding the reservoir chamber 96 is maintained at about 15 PSIG by the force balance between pressure on the smaller diaphragm area A1 and the piston springs 45. When the draw off of product water is discontinued at faucet 100 and product water again begins to fill reservoir chamber 94, excess control (squeeze) water is forced out of line 31 into the diaphragm control valve 30 where it presses against diaphragm area A1 and the control water pressure increases to maintain a force balance with the piston springs 45 which have been further compressed. When the control pressure reaches about 20 PSIG, the balance of forces is sufficient to open outlet valve 38 and a rapid downshift of pressure from about 20 PSIG to about 5 PSIG occurs because the control water chamber 96 is now in communication with the relief valve 46 and on the larger diaphragm area A2 while still acting on smaller area A1. Now the force balance is strongly in the down direction to move the outlet valve 38 to the full open position. Relief valve 46 in the drain line 24 from the diaphragm control valve maintains a high enough back pressure, about 5 PSIG, on diaphragm areas A1 and A2 to hold the outlet valve 38 open. Without this ball relief valve, as soon as the control valve pressure downshifts, it would very soon upshift again, then downshift again if the reservoir is still filling, resulting in an undesirable cycling condition.

It should be noted that the control water pressure from diaphragm regulating valve 30 is derived entirely from waste water and has no connection to the product (purified) water.

The diaphragm regulating valve feeds only enough control water to the pressurizing end of the reservoir 96 to displace product water from the other end 94 while drawing off product water at the desired pressure level (15 PSIG). It also releases control water from this same chamber 96 at a lower pressure level (5 PSIG) to minimize back pressure while filling, without sending any unnecessary water to the drain, thereby conserving water usage. Reverse osmosis water purification systems conventionally send waste water to the drain to flush away the salts on the upstream side of the membrane, and this flow is controlled usually by a restrictor. In the above-described system, such flow to the drain is avoided, and the reject water is put back to the downstream of the line section 104.

From the foregoing description it will be apparent that there has been provided an improved water purification system in which waste or reject water is recovered and returned to the feed line where it may be supplied to other utilization equipment in the facility utilizing the water purification system and there used for various useful purposes instead of being wasted. While three embodiments of the invention have been described, variations and modifications thereof within the scope of the invention will undoubtedly suggest themselves to those skilled in the art. Accordingly, the foregoing description should be taken as illustrative and not in a limiting sense.

We claim:

1. A water purification system comprising a section of a water line which supplies water through said section to utilization equipment, such as faucets, toilets, washing machines and the like, a reverse osmosis system having a feed water inlet, a reject water outlet and a product water outlet, means in said line section for establishing a differential pressure thereacross when water flows through said line when demanded by said utilization equipment, and means for connecting said reverse osmosis system to said line so that water supplied by said line flows from the feed water inlet to the reject water outlet in response to said differential pressure and product water is produced at said product water outlet.

2. The system according to claim 1 wherein said means for establishing said differential pressure includes means for establishing a pressure drop across said section exceeding the pressure drop between said feed water inlet and said reject water outlet.

3. The system according to claim 1 wherein said reverse osmosis system is connected in parallel with said line section between the feed water inlet and the reject water outlet of said reverse osmosis system.

4. The system according to claim 3 wherein said line section has an upstream end and a downstream end, said upstream end being connected through said line to a water supply, and said downstream end being connected to said utilization equipment, a check valve connected between said reject water outlet and said downstream end for permitting flow of said reject water only toward said downstream end.

5. The system according to claim 4 further comprising a drain, means for enabling the flow of water from said water supply through said reverse osmosis system and from the reject water outlet thereof to said drain even in the absence of said differential pressure and for stopping the flow to said drain in response to the presence of said differential pressure.

6. The system according to claim 5 wherein said means for enabling and stopping flow to said drain comprising a control valve having a pressure responsive valve controller, said control valve being connected between a junction between said reject water outlet and said check valve and said drain, and said controller being connected across said section.

7. The system according to claim 6 wherein a restrictor is connected in series in said section for establishing said differential pressure.

8. The system according to claim 7 wherein said restrictor is an orifice which restricts the flow through said section.

9. The system according to claim 6 further comprising a restrictor connected between said control valve and said drain for developing a substantial part of the pressure drop between said water supply and said drain when said control valve is open.

10. The system according to claim 1 wherein said line section has an upstream end and a downstream end, said upstream end being connected through said line to a water supply and said downstream end being connected through said line to said utilization equipment, means responsive to said differential pressure for enabling circulation of said water through said reverse osmosis system via said feed water inlet thereof when said differential pressure corresponds to a flow of water drawn by said utilization equipment sufficient to produce product water from said reverse osmosis system, said reverse osmosis system delivering water form said reject water outlet to said downstream end of said section and thereby to said utilization equipment.

11. The system according to claim 10 wherein said reject water outlet is connected to the downstream end of said section via a check valve which permits flow only toward said downstream end of said section.

12. The system according to claim 10 wherein said means for enabling the circulation of said water via said feed water inlet comprises a normally closed control valve.

13. The system according to claim 12 wherein said differential pressure establishing mean comprises a flow restrictor in series in said section, said control valve having a pressure responsive controller connected across said restrictor.

14. The system according to claim 13 wherein said restrictor is an orifice through which all water flows through said section from said upstream and to said downstream end thereof.

15. The system according to claim 13 further comprising reservoir means having a bladder separating said reservoir means into a product water chamber and a squeeze water chamber, control valve means connecting said reject water outlet to said squeeze water chamber for supplying reject water from said outlet to said squeeze water chamber to pressurize said chamber and said product water chamber for driving product water therefrom, said pressure responsive controller also being connected to said control valve means for opening said normally closed control valve to open in response to the pressure in said squeeze water chamber for enabling the circulation of eater through said reserve osmosis system for supplying reject water from said reverse osmosis system to said squeeze water chamber.

16. The system according to claim 1 further comprising means providing a reservoir for said product water, from which product water can be withdrawn for use, and means for connecting said product water outlet to said reservoir.

17. The system according to claim 16 wherein said reservoir is a storage tank.

* * * * *